US012296593B2

(12) United States Patent
Lee

(10) Patent No.: US 12,296,593 B2
(45) Date of Patent: May 13, 2025

(54) INKJET PRINTING EQUIPMENT CAPABLE OF MEASURING DROPLET

(71) Applicant: SEMES CO., LTD., Cheonan-si (KR)

(72) Inventor: Bong Moon Lee, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 152 days.

(21) Appl. No.: 17/994,040

(22) Filed: Nov. 25, 2022

(65) Prior Publication Data

US 2023/0191786 A1 Jun. 22, 2023

(30) Foreign Application Priority Data

Dec. 20, 2021 (KR) ........................ 10-2021-0182541

(51) Int. Cl.
*B41J 2/165* (2006.01)
*B41J 2/045* (2006.01)

(52) U.S. Cl.
CPC ......... *B41J 2/16517* (2013.01); *B41J 2/0451* (2013.01); *B41J 2/04586* (2013.01)

(58) Field of Classification Search
CPC .... B41J 2/0451; B41J 2/04586; B41J 29/393; B41J 29/17; B41J 13/0027; B41J 13/08
See application file for complete search history.

(56) References Cited

U.S. PATENT DOCUMENTS

| | | | | |
|---|---|---|---|---|
| 2010/0245432 A1* | 9/2010 | Takeda | ..................... | B41J 29/38 347/14 |
| 2017/0186956 A1* | 6/2017 | Shin | ..................... | H10K 71/191 |
| 2023/0055700 A1* | 2/2023 | Lee | ........................ | B41J 2/0451 |

FOREIGN PATENT DOCUMENTS

| | | |
|---|---|---|
| JP | 2011-148131 | 8/2011 |
| JP | 2011-255366 | 12/2011 |
| KR | 10-2011-0013917 | 2/2011 |
| KR | 10-2021-0104385 | 8/2021 |

OTHER PUBLICATIONS

Office Action from the Korean Intellectual Property Office dated Aug. 25, 2023.

* cited by examiner

*Primary Examiner* — Thinh H Nguyen

(57) ABSTRACT

Inkjet printing equipment capable of measuring a droplet includes a process stage providing a processing space for a process substrate, a pair of guide members disposed on opposite sides of the process stage, a head unit discharging a droplet onto the process substrate, a first gripper moving along the pair of guide members and gripping a side portion of the process substrate, a second gripper configured to move along the guide members and gripping a measurement substrate onto which a droplet is discharged in order to inspect the head unit, and a droplet inspection unit inspecting a discharge state of the droplet discharged onto the measurement substrate and outputting information of whether the discharge state of the droplet is normal or abnormal.

7 Claims, 15 Drawing Sheets

INKJET PRINTING EQUIPMENT CAPABLE OF MEASURING DROPLET

CROSS REFERENCE TO RELATED APPLICATION

The present application claims priority to Korean Patent Application No. 10-2021-0182541, filed Dec. 20, 2021, the entire contents of which is incorporated herein for all purposes by this reference.

BACKGROUND OF THE INVENTION

1. Field of the Invention

The present invention relates to inkjet printing equipment capable of measuring a droplet.

2. Description of the Related Art

A display manufacturing process includes a plurality of processing processes for forming an element for light emission on a substrate (transparent glass). For example, the processing processes may include coating, exposure, deposition, cleaning, and etching. Each processing process may be sequentially performed by pieces of manufacturing equipment disposed in a display manufacturing plant. Meanwhile, an inkjet printing method of discharging droplets (ink) on a substrate to form a film or a pattern has been introduced as the processing process.

An inkjet printing process is performed by discharging droplets (ink) on a substrate. In a case where droplets or foreign substances remain on a nozzle of a head unit that discharges droplets, an error may occur at a discharge position of the droplet.

SUMMARY OF THE DISCLOSURE

Embodiments of the present invention provide inkjet printing equipment capable of measuring a droplet, that is capable of inspecting a discharge state of a droplet and determining a problem in a head unit in advance.

The problems to be solved according to the present invention are not limited to those mentioned above, and other problems not mentioned will be clearly understood by those skilled in the art from the following description.

According to the present disclosure, inkjet printing equipment capable of measuring a droplet includes a process stage providing a processing space for a process substrate, a pair of guide members disposed on opposite sides of the process stage, a head unit discharging a droplet onto the process substrate, a first gripper moving along the pair of guide members and gripping a side portion of the process substrate, a second gripper configured to move along the guide members and gripping a measurement substrate onto which a droplet is discharged in order to inspect the head unit, and a droplet inspection unit inspecting a discharge state of the droplet discharged onto the measurement substrate and outputting information of whether the discharge state of the droplet is normal or abnormal.

According to an aspect of the present disclosure, inkjet printing equipment capable of measuring a droplet includes a process stage configured to provide a processing space for a process substrate, a pair of guide members disposed on opposite sides of the process stage, a head unit configured to discharge a droplet onto the process substrate, a first gripper configured to grip a side portion of the process substrate, a second gripper configured to grip a measurement substrate onto which a droplet is discharged in order to inspect the head unit, a droplet inspection unit configured to inspect a discharge state of the droplet discharged onto the measurement substrate, and a cleaning unit configured to remove a droplet remaining on the measurement substrate.

According to an aspect of the present disclosure, inkjet printing equipment capable of measuring a droplet includes a loading section in which a process substrate is carried in or out, a process processing section in which process processing is performed on the process substrate, a maintenance section disposed to be adjacent to the process processing section and in which maintenance is performed for process processing, a gantry installed above the process processing section and the maintenance section, and a head unit configured to be movable along the gantry and discharge a solution for processing the process substrate. The process processing section may include a process stage configured to provide a processing space for a process substrate, a first gripper configured to be movable along the guide member and grip a side portion of the process substrate, a second gripper configured to be movable along the guide member and grip a measurement substrate onto which a droplet is discharged in order to inspect the head unit, a droplet inspection unit configured to inspect a discharge state of the droplet discharged onto the measurement substrate, and a cleaning unit configured to remove a droplet remaining on the measurement substrate.

According to the present invention, a droplet is discharged onto the measurement substrate gripped by the second gripper, and the droplet discharged onto the measurement substrate is inspected with the droplet inspection unit. Thus, it is possible to determine and handle a problem of the head unit in advance.

Effects of the present invention are not limited to those mentioned above, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description taken in conjunction with the accompanying drawings, in which.

DESCRIPTION OF THE EMBODIMENTS

Hereinafter, embodiments of the present disclosure will be described in detail with reference to the attached drawings to be easily implemented by those skilled in the art. The present disclosure may be implemented in various different forms and is not limited to the embodiments described herein.

In order to clearly describe the present disclosure, parts that are not related to the description will be omitted, and the same or similar components in this specification are denoted by the same reference sign.

In addition, in various embodiments, a component having the same configuration will be described only in a representative embodiment by using the same reference sign, and only a configuration that is different from that of the representative embodiment will be described in other embodiments.

In the entirety of this specification, a sentence that a portion is "connected (or coupled) to" another portion includes not only a case of "being directly connected (coupled)" but also a case of "being indirectly connected (coupled) with other members interposed therebetween". In addition, a sentence that a portion "includes" a component means that it may further include another component rather than excluding other components unless a particularly opposite statement is made.

Unless otherwise defined, all terms used herein, including technical or scientific terms, have the same meaning as generally understood by those skilled in the art. Terms such as those defined in a commonly used dictionary should be construed as having a meaning consistent with the meaning of the relevant technology, and should not be construed as an ideal or excessively formal meaning unless explicitly defined in this application.

Inkjet printing equipment capable of measuring a droplet and an inkjet printing processing system according to the present disclosure will be described below. In an inkjet printing system according to the present disclosure, when an inkjet discharge problem is detected, or periodically, an inspection is performed by transferring a head unit that discharges a droplet into a separate space (maintenance zone), and causing the head unit to discharge a droplet onto a test film.

In a case where the inspection is performed in the space separated from a process processing space as described above, there is a problem in that it is difficult to perform an accurate inspection due to differences in process conditions such as a temperature, humidity, and an airflow. In particular, the recent inkjet printing process requires micrometer precision, and even a slight difference in process environment may affect overall process precision. Thus, the embodiment of the present disclosure provides a method of inspecting a discharge state of a droplet by the head unit in the same environment as the process processing space.

Figure 1:
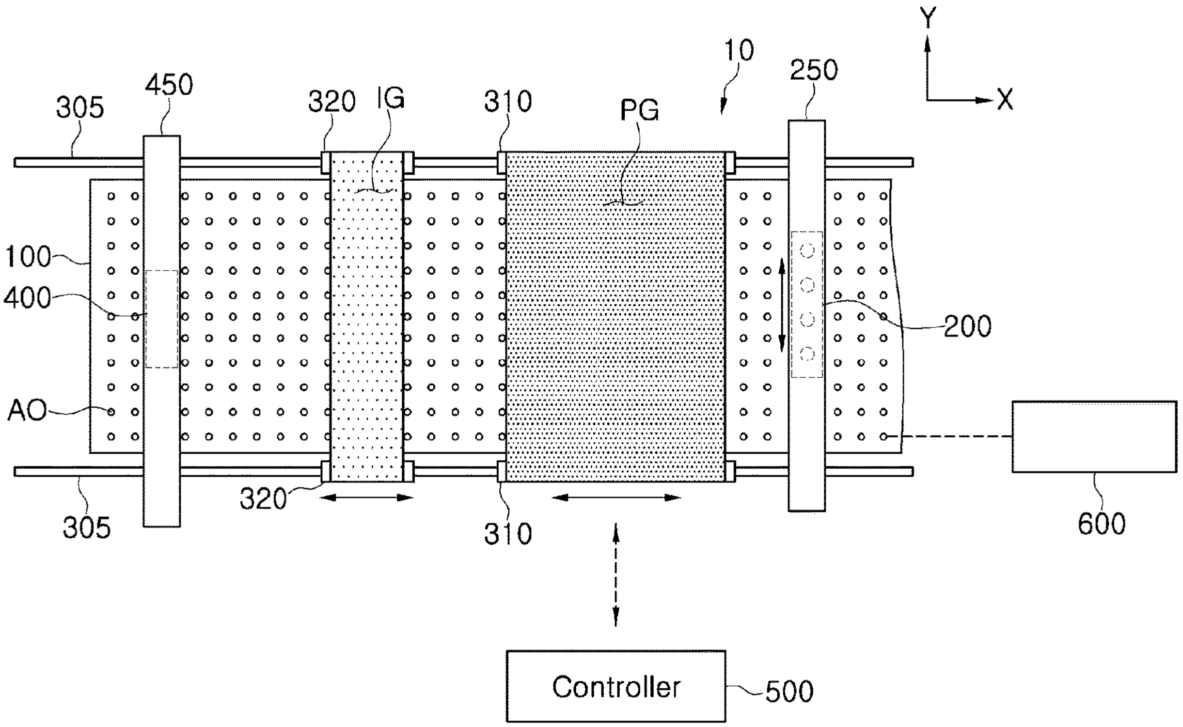
FIG. 1 illustrates a schematic structure of inkjet printing equipment according to an embodiment of the present disclosure.

FIG. 1 illustrates a schematic structure of inkjet printing equipment 10 according to the embodiment of the present disclosure. According to the present disclosure, the inkjet printing equipment 10 capable of measuring a droplet includes a process stage 100 configured to provide a processing space for a process substrate PG, guide members 305 disposed on both sides of the process stage 100, a head unit 200 configured to discharge a droplet onto the process substrate PG, a first gripper 310 configured to be movable along the guide member 305 and grip a side portion of the process substrate PG, a second gripper 320 configured to be movable along the guide member 305 and grip a measurement substrate IG onto which a droplet is discharged in order to inspect the head unit 200, and a droplet inspection unit 400 configured to inspect a discharge state of the droplet discharged onto the measurement substrate IG. The inkjet printing equipment 10 may be provided with a controller 500 that controls the head unit 200 in accordance with a discharge state of a droplet on the measurement substrate IG.

According to the present disclosure, the process substrate PG and the measurement substrate IG may move in a first direction (X-direction) by the first gripper 310 and the second gripper 320, while floating by air pressure applied through an air output provided in the process stage 100, and the head unit 200 is configured to discharge the droplet onto the process substrate PG and the measurement substrate IG while moving along a first gantry 250 installed above the process stage 100 in a second direction (Y-direction) perpendicular to the first direction (X-direction).

The process stage 100 is provided with a predetermined area and provides a space for processing the process substrate PG. The first gripper 310 and the second gripper 320 are configured to move along the guide members 305 provided on both sides of the process stage 100. Although FIGS. 1, 8, 12, and 13 illustrate that the first gripper 310 and the second gripper 320 move along the same guide member 305, a separate guide member (first guide member and second guide member) may be provided for the movement of the first gripper 310 and the second gripper 320.

The air is discharged through a plurality of air outlets AO formed at the process stage 100, and the process substrate PG and the measurement substrate IG may be transferred by the first gripper 310 and the second gripper 320, while floating by the air pressure. The first gripper 310 and the second gripper 320 may move in the first direction (X-direction) while attracting the process substrate PG and the measurement substrate IG by a vacuum attraction method. In an embodiment, an air compressor 600 may be connected to the plurality of air outlets AO to supply a pressurized air flow via the air outlets AO.

The head unit 200 is a device that supplies a chemical solution onto a substrate and may include a storage portion in which the chemical solution is stored, and a plurality of nozzles for discharging the chemical solution. The head unit 200 may move along the first gantry 250 in the second direction (Y-direction) perpendicular to the first direction (X-direction).

The droplet inspection unit 400 is configured to inspect a discharge state of a droplet discharged onto the measurement substrate IG. The droplet inspection unit 400 may be installed at a second gantry 450 installed above the process stage 100 and may inspect the discharge state (discharge position) of a droplet by capturing an image of the measurement substrate IG from the top.

According to the embodiment, the droplet inspection unit 400 may be configured by an ultrasonic sensor that applies an ultrasonic signal, and thus check the shape of each droplet based on the ultrasonic signal. The droplet inspection unit 400 may provide the controller 500 with information on the droplet on the measurement substrate IG.

The controller controls the overall operation of the inkjet printing equipment 10 and, in particular, controls the operation of the head unit 200 in accordance with a droplet discharge state on the measurement substrate IG. For example, when the droplet on the measurement substrate IG is determined to be abnormal, the controller 500 may output an alarm to stop the operation of the head unit 200 and perform maintenance. When the droplet on the measurement substrate IG is determined to be normal, the controller 500 may control the process substrate PG to be carried in and control the head unit 200 to discharge the chemical solution for process processing onto the process substrate PG.

Figure 2:
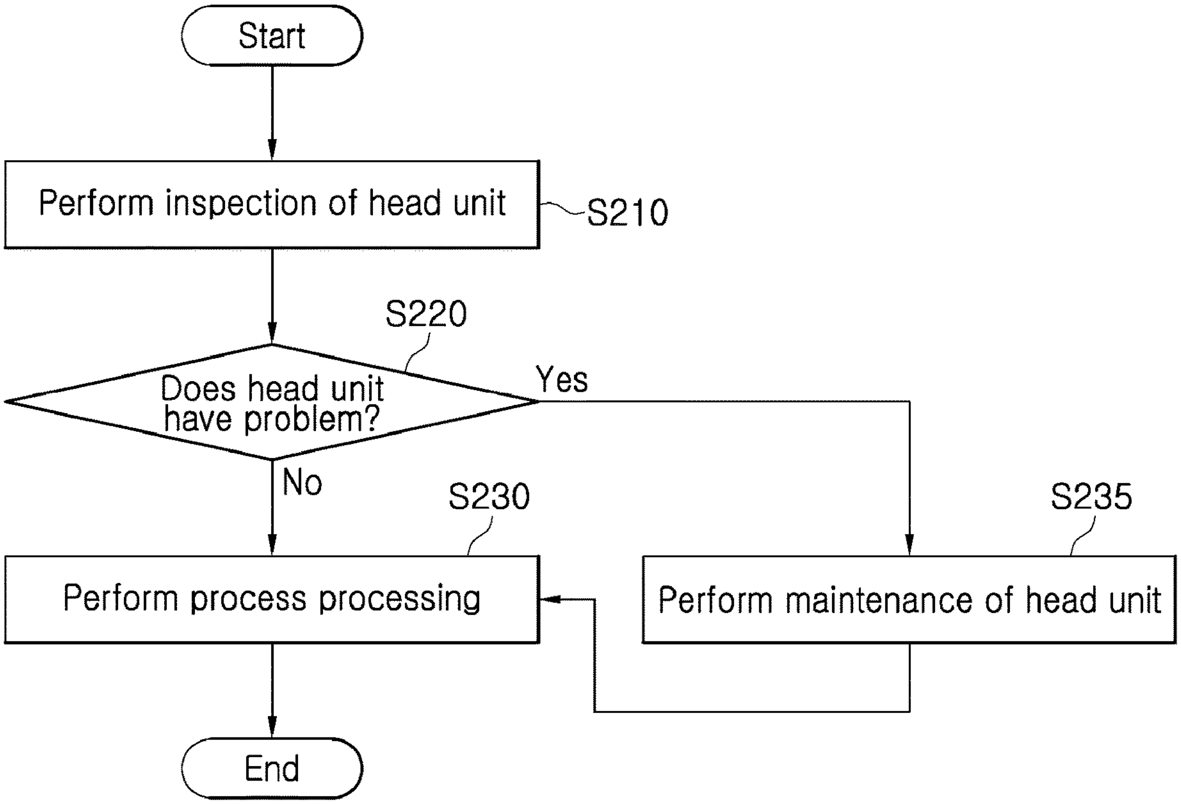
FIG. 2 is a flowchart illustrating an operation of the inkjet printing equipment according to the embodiment of the present disclosure.

FIG. 2 is a flowchart illustrating a method of operating the inkjet printing equipment 10 according to the embodiment of the present disclosure. The method of operating the inkjet printing equipment 10 according to the embodiment of the present disclosure includes a step (S210) of performing an inspection of the head unit 200, a step (S220) of determining whether or not the head unit 200 has a problem, a step (S230) of performing an inkjet printing process when the head unit 200 has no problem, and a step (S235) of performing maintenance on the head unit 200 when the head unit 200 has a problem. A step of performing process processing may be performed after the maintenance on the head unit 200 has completed. The step (S210) of performing an inspection of the head unit may be performed again after the maintenance on the head unit 200 has completed.

Figure 3:
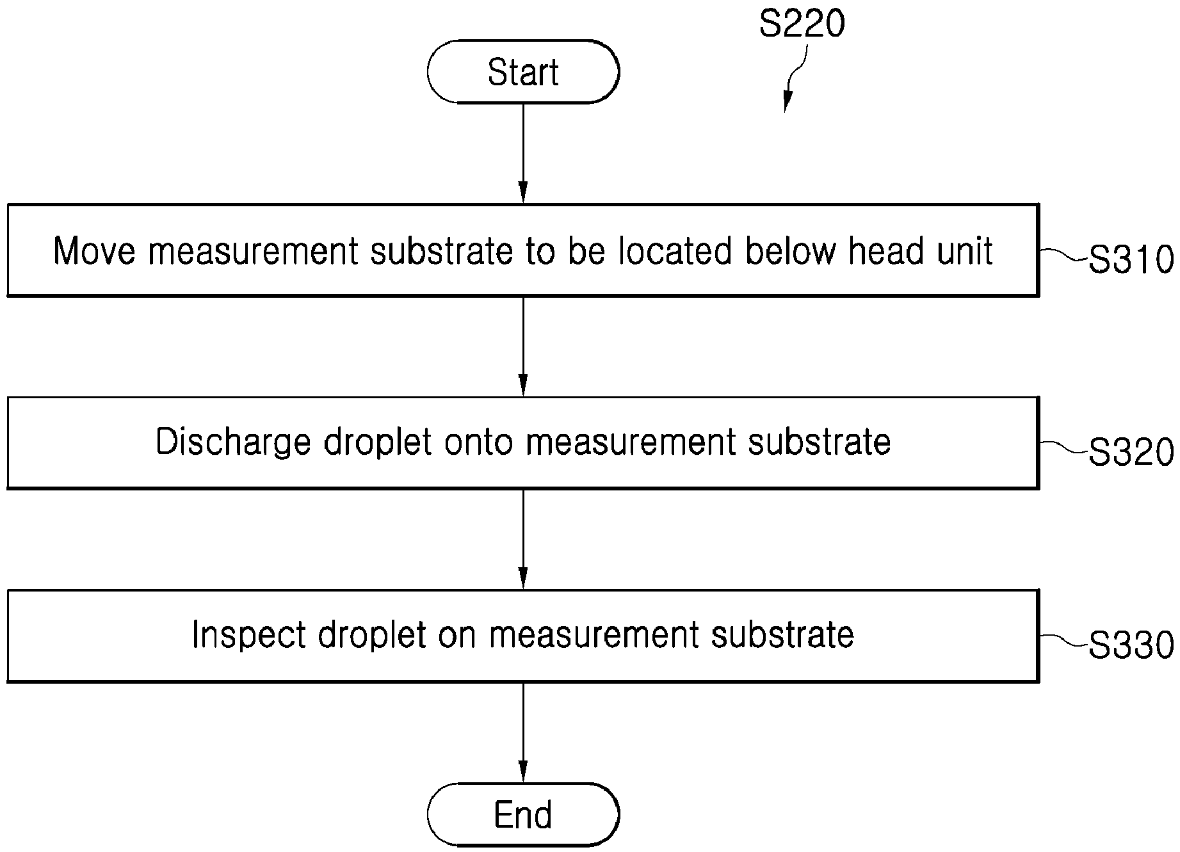
FIG. 3 is a flowchart illustrating an inspection procedure of a head unit according to the embodiment of the present disclosure.

FIG. 3 is a flowchart illustrating an inspection procedure of the head unit 200 according to the embodiment of the present disclosure. The step (S210) of performing an inspection on the head unit 200 includes a step (S310) of moving the measurement substrate IG to be located below the head unit 200, a step (S320) of discharging a droplet onto the measurement substrate IG, and a step (S330) of inspecting the droplet on the measurement substrate IG.

Figure 4:
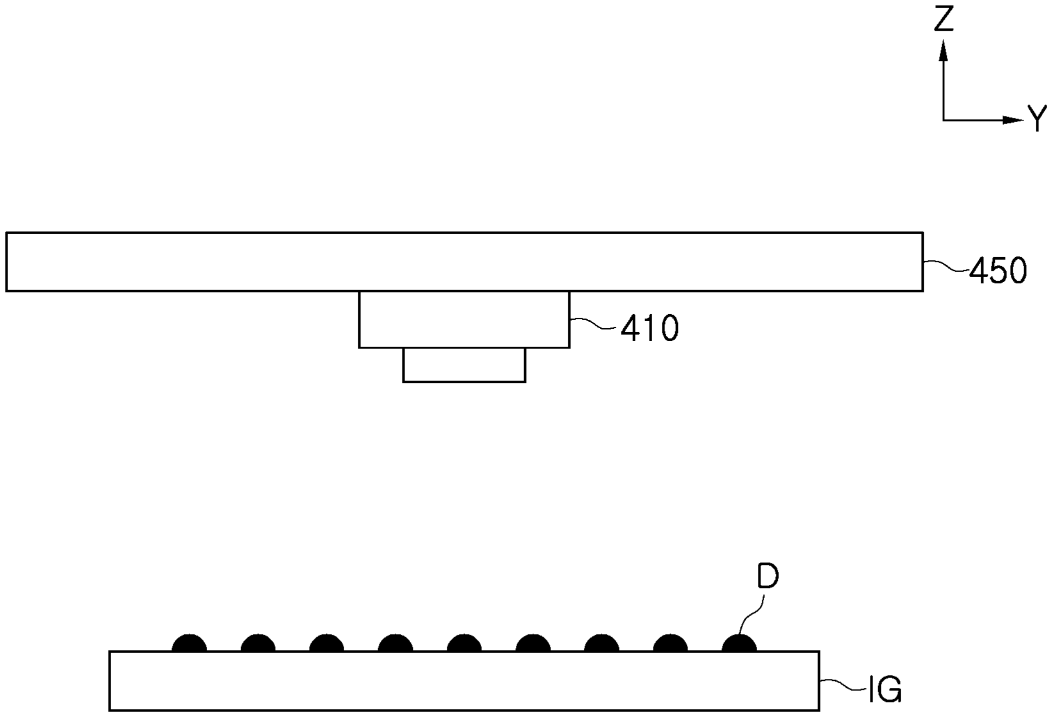
FIGS. 4 and 5 illustrate a schematic configuration of a droplet inspection unit according to the embodiment of the present disclosure.
Figure 5:
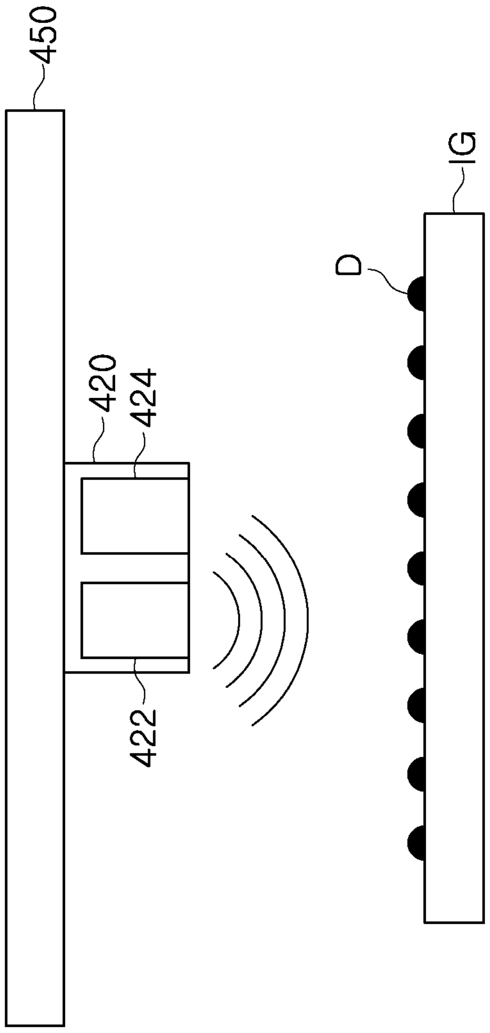

FIGS. 4 and 5 illustrate a schematic configuration of the droplet inspection unit 400 according to the embodiment of the present disclosure.

According to the embodiment of the present disclosure, the droplet inspection unit 400 includes a vision inspection unit 410 that captures an image of the droplet on the measurement substrate IG and inspects the discharge position of the droplet or the shape of the droplet from the captured image. As illustrated in FIG. 4, the vision inspection unit 410 is installed at the second gantry 450 located above the process stage 100, and the discharge position of the droplet D or the shape of the droplet D may be inspected based on the image of the droplet D captured by the vision inspection unit 410. The vision inspection unit 410 may compare the position of the droplet D discharged onto the measurement substrate IG to a reference position and output information on a nozzle in which a discharge failure has occurred in the head unit 200. In addition, the vision inspection unit 410 may compare the shape of the droplet D to a reference shape and output the information on the nozzle in which a discharge failure has occurred in the head unit 200. In an embodiment, the vision inspection unit 410 may include an image sensor such as a CMOS image sensor, and a processor operating an image analysis software for analyzing the shape and location of the droplet D with reference to the reference shape and location of a droplet generated by the head unit 200 that properly operates.

According to the embodiment of the present disclosure, the droplet inspection unit 400 includes an ultrasonic inspection unit 420 that applies an ultrasonic transmission signal to the droplet D on the measurement substrate IG, receives an ultrasonic reflection signal obtained by reflection from the droplet D, and inspects the shape of the droplet D based on the ultrasonic reflection signal. As illustrated in FIG. 5, the ultrasonic inspection unit 420 including an ultrasonic transmitter 422 and an ultrasonic receiver 424 is installed at the second gantry 450 located above the process stage 100, and the discharge position of the droplet D or the shape of the droplet D may be inspected by an analysis of ultrasonic signals reflected by the droplet D and the measurement substrate IG. The ultrasonic inspection unit 420 may compare the position of the droplet D discharged onto the measurement substrate IG to a reference position and output information on a nozzle in which a discharge failure has occurred in the head unit 200. In addition, the ultrasonic inspection unit 420 may compare the shape of the droplet D to a reference shape and output the information on the nozzle in which a discharge failure has occurred in the head unit 200.

Figure 6A:
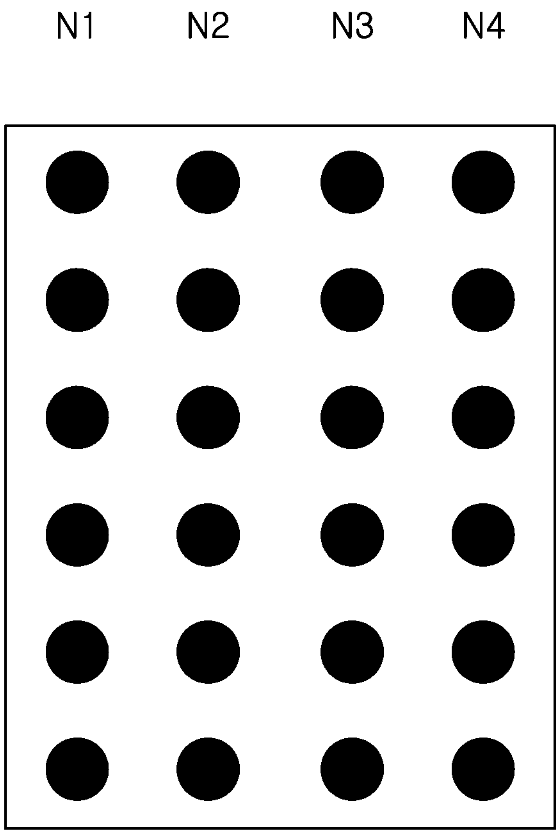
FIGS. 6A and 6B illustrate examples of a case where a droplet is discharged at a normal position and a case where a discharge position has a problem.
Figure 6B:
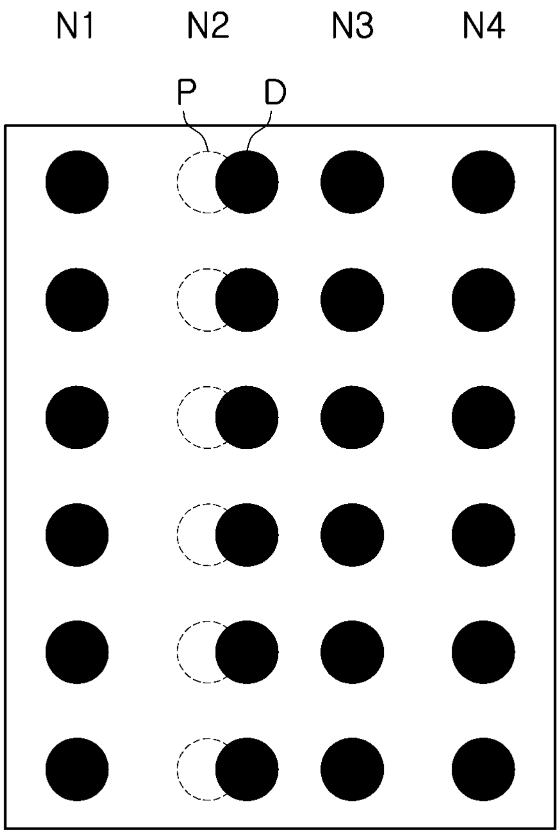
Figure 7A:
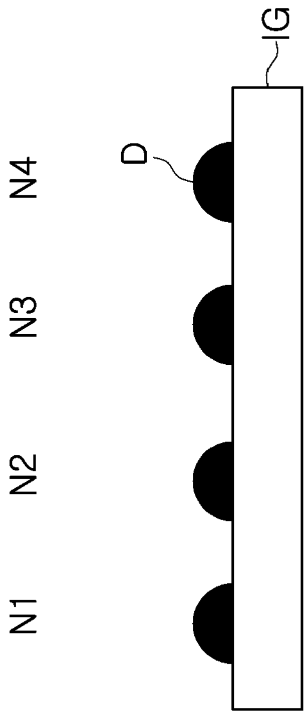
FIGS. 7A and 7B illustrate examples of a case where a droplet having a normal shape is discharged and a case where a discharge shape of a droplet has a problem.
Figure 7B:
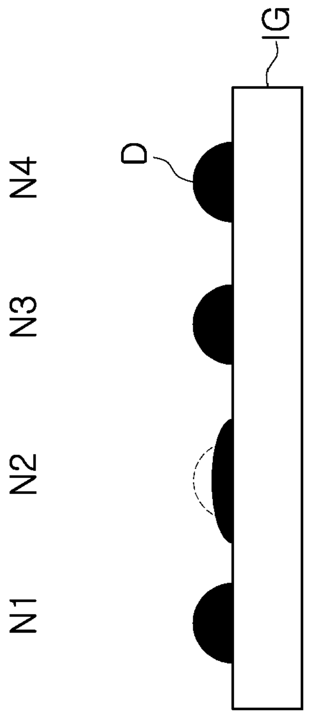

For example, in a case where all droplets D are discharged at the reference positions as illustrated in FIG. 6A, the droplet inspection unit 400 may determine that the head unit 200 has no problem. On the contrary, in a case where the position at which the droplet D is discharged deviates from the reference position P as illustrated in FIG. 6B, the droplet inspection unit 400 may determine that the head unit 200 has a problem. In particular, in a case where the discharge position for a specific nozzle N2 among nozzles N1 to N4 of the head unit 200 deviates from the reference position P as illustrated in FIG. 7B, the droplet inspection unit 400 may determine that the nozzle N2 has a problem.

According to the embodiment of the present disclosure, when the droplet discharge state on the measurement substrate IG is abnormal, the droplet inspection unit 400 may output a signal indicating that a problem has occurred in the head unit 200. For example, the droplet inspection unit 400 may perform an action such as transmission of a problem message (for example, head failure contents and failure nozzle information) indicating a problem has occurred in the head unit 200 to a management device (PC) of the inkjet printing equipment 10 and replacement and inspection of the head unit 200 by the problem message.

In addition, an inspection on the shape of the droplet may be performed. For example, in a case where shapes of all droplets D coincide with the reference shape as illustrated in FIG. 7A, the droplet inspection unit 400 may determine that the head unit 200 has no problem. On the contrary, in a case where the shape of the droplet D does not coincide with the reference shape as illustrated in FIG. 7B, the droplet inspection unit 400 may determine that the head unit 200 has a problem. In particular, in a case where the shape of the droplet D discharged from the specific nozzle N2 among the nozzles N1 to N4 of the head unit 200 does not coincide with the reference shape as illustrated in FIG. 7B, the droplet inspection unit 400 may determine that the nozzle N2 has a problem. When the inspection on the droplet D has completed, the measurement substrate IG may be replaced. The measurement substrate IG may be made of glass of the same material as the process substrate PG, and any type of material capable of a droplet inspection such as a film may be used.

Figure 8:
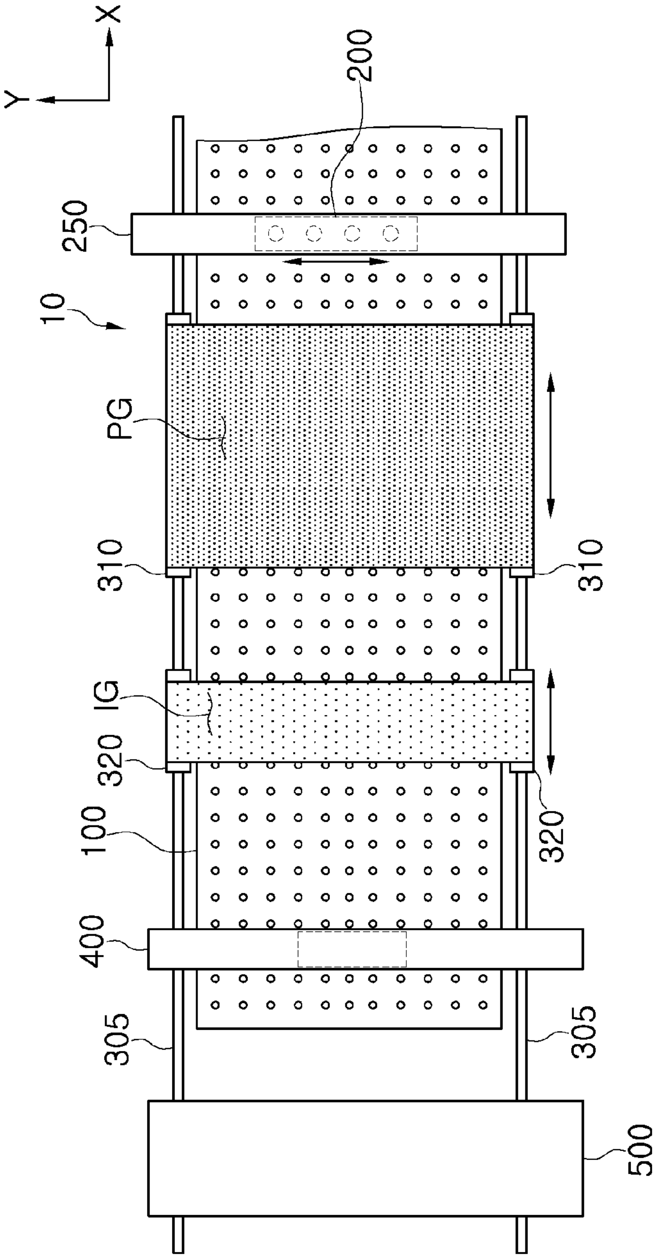
FIG. 8 illustrates a schematic structure of inkjet printing equipment provided with a cleaning unit according to an embodiment of the present disclosure.

FIG. 8 illustrates a schematic structure of the inkjet printing equipment provided with a cleaning unit according to an embodiment of the present disclosure. According to the present disclosure, an inkjet printing equipment 10 may further include a cleaning unit 500 that removes the droplet remaining on the measurement substrate IG after the droplet is discharged onto the measurement substrate IG, and an inspection is performed.

According to an embodiment of the present disclosure, the inkjet printing equipment 10 may include a process stage 100 configured to provide a processing space for a process substrate PG, a head unit 200 configured to discharge a droplet D onto the process substrate PG, a first gripper 310 configured to grip the side portion of the process substrate PG, a second gripper 320 configured to grip a measurement substrate IG onto which a droplet D is discharged in order to inspect the head unit 200, guide members 305 disposed on both sides of the process stage 100 and configured to provide a movement path of the first gripper 310 and the second gripper 320, a droplet inspection unit 400 configured to inspect a discharge state of the droplet D discharged onto the measurement substrate IG, and a cleaning unit 500 configured to remove the droplet D on the measurement substrate IG.

After the inspection on the droplet D has completed, the measurement substrate IG may be replaced. Alternatively, the measurement substrate IG can be re-used after the droplet D is removed by performing cleaning of the measurement substrate IG. According to the present disclosure, since the droplet D discharged onto the measurement substrate IG is removed with the cleaning unit 500, it is possible to re-use the measurement substrate IG. The surface of the measurement substrate IG may be treated with water repellent coating in order to efficiently remove the droplet D discharged onto the measurement substrate IG.

According to the present disclosure, as illustrated in FIG. 8, the cleaning unit 500 may be disposed to be adjacent to the process stage 100, and the guide member 305 may extend to the cleaning unit 500.

The second gripper 320 gripping the measurement substrate IG moves to the head unit 200 while gripping the measurement substrate IG, and thus a droplet is discharged onto the measurement substrate IG. Then, when the droplet D is discharged, the second gripper 320 may transfer the measurement substrate IG to the droplet inspection unit 400. When an inspection on the droplet on the measurement substrate IG has completed, the second gripper 320 may transfer the measurement substrate IG to the cleaning unit 500.

When the measurement substrate IG is transferred to the cleaning unit 500, the droplet D and foreign substances remaining on the measurement substrate IG may be removed by the cleaning unit 500. Cleaning of the measurement substrate IG may be performed regardless of processing of the process substrate PG or may be performed during a period in which the process is not performed. After cleaning of the measurement substrate IG has completed, the measurement substrate IG may stay at the cleaning unit 500 to stand by or move to a separate standby position.

Figure 9:
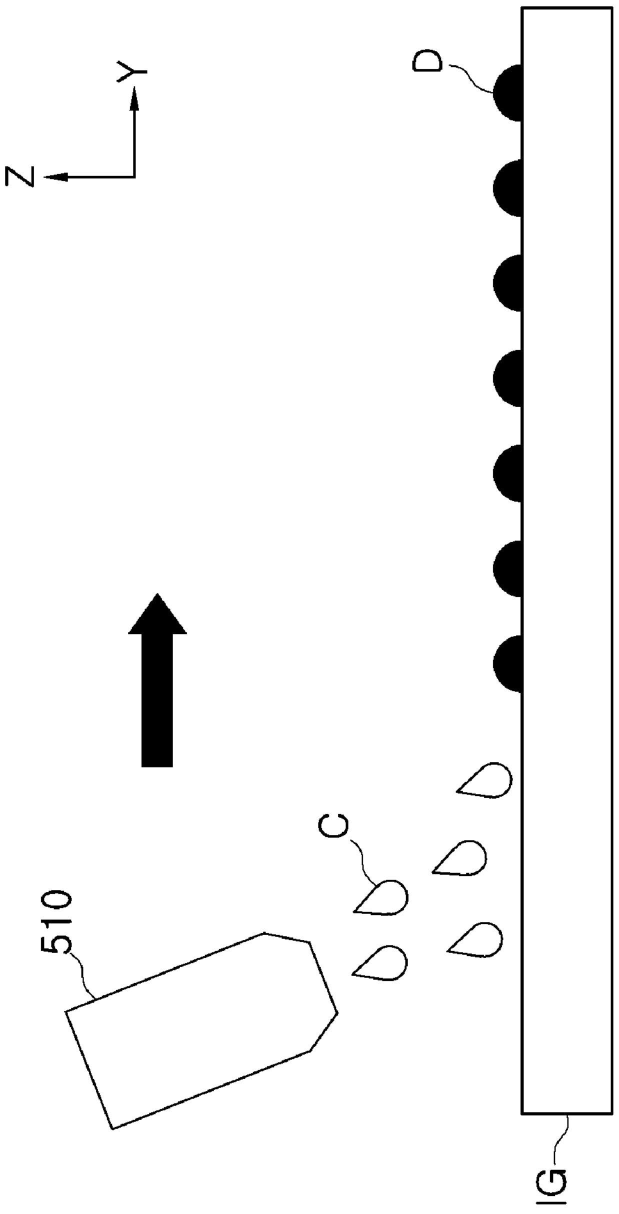
FIGS. 9 to 11 illustrate a cleaning method of a measurement substrate with the cleaning unit according to the embodiment of the present disclosure.

According to the embodiment of the present disclosure, the cleaning unit 500 may include a cleaning solution discharge unit 510 that removes the droplet D on the measurement substrate IG by discharging a cleaning solution C onto the measurement substrate IG. As illustrated in FIG. 9, the cleaning solution discharge unit 510 may remove the remaining droplet D by discharging the cleaning solution C onto the measurement substrate IG. The cleaning solution discharge unit 510 may perform cleaning of the measurement substrate IG by discharging the cleaning solution C while moving in a horizontal direction (Y-direction). The cleaning unit 500 may include a dryer-type drying device that sprays air having a high temperature or room temperature in order to dry the remaining cleaning solution C.

Figure 10:
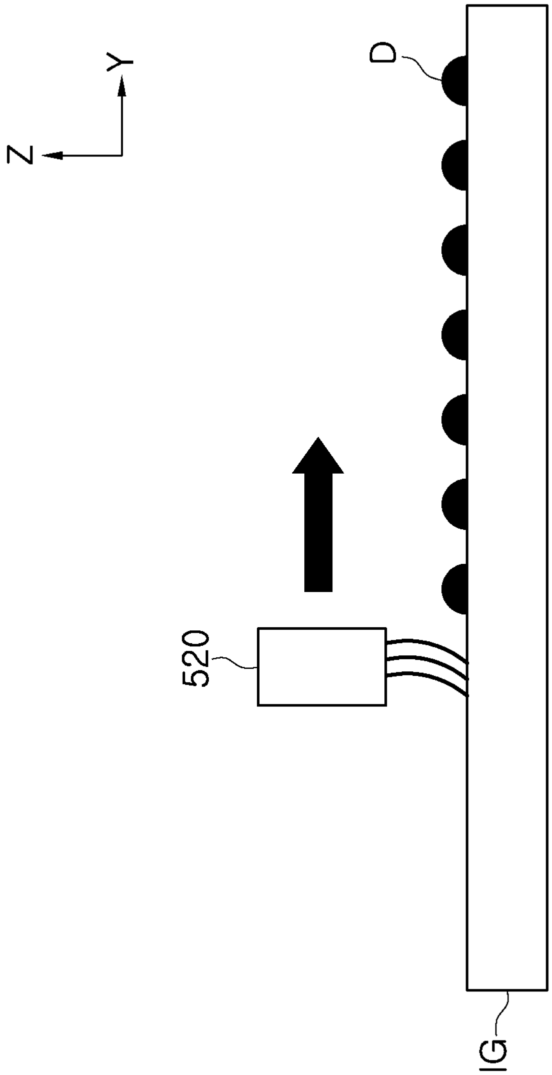

According to the embodiment of the present disclosure, the cleaning unit 500 may include a cleaning wiper 520 that removes the droplet D on the measurement substrate IG by a physical contact. As illustrated in FIG. 10, the cleaning wiper 520 may remove the remaining droplet D while moving on the measurement substrate IG in the horizontal direction (Y-direction). The cleaning wiper 520 may include a cloth blotter or a brush for wiping the droplet D.

Figure 11:
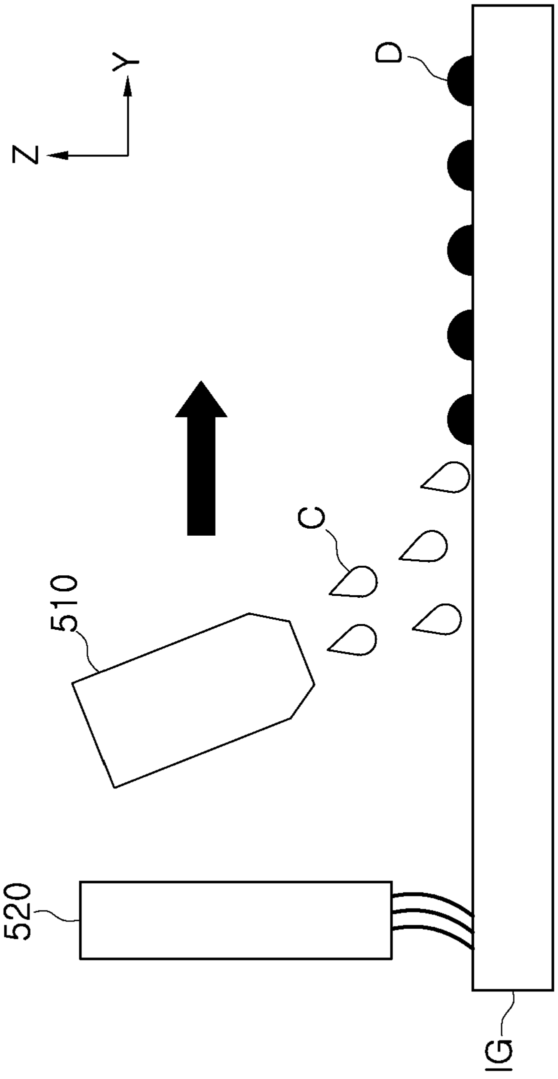

In addition, the cleaning solution discharge unit 510 and the cleaning wiper 520 may be provided together to remove the droplet D remaining on the measurement substrate IG. As illustrated in FIG. 11, the cleaning solution discharge unit 510 and the cleaning wiper 520 may move together in the horizontal direction (Y-direction). The cleaning solution discharge unit 510 may discharge the cleaning solution C, and simultaneously, the cleaning wiper 520 may wipe off the remaining cleaning solution C and the residues of the droplet D.

Figure 12:
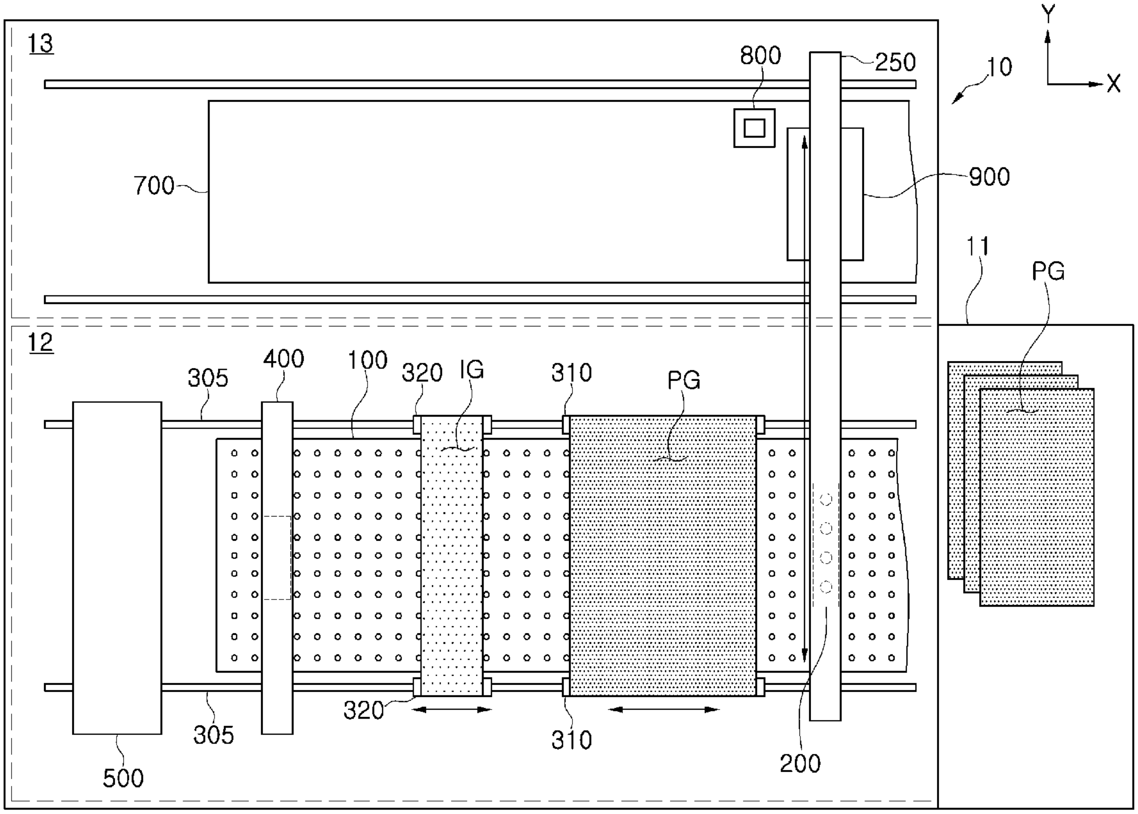
FIGS. 12 and 13 illustrate a schematic structure of inkjet printing equipment according to still an embodiment of the present disclosure.
Figure 13:
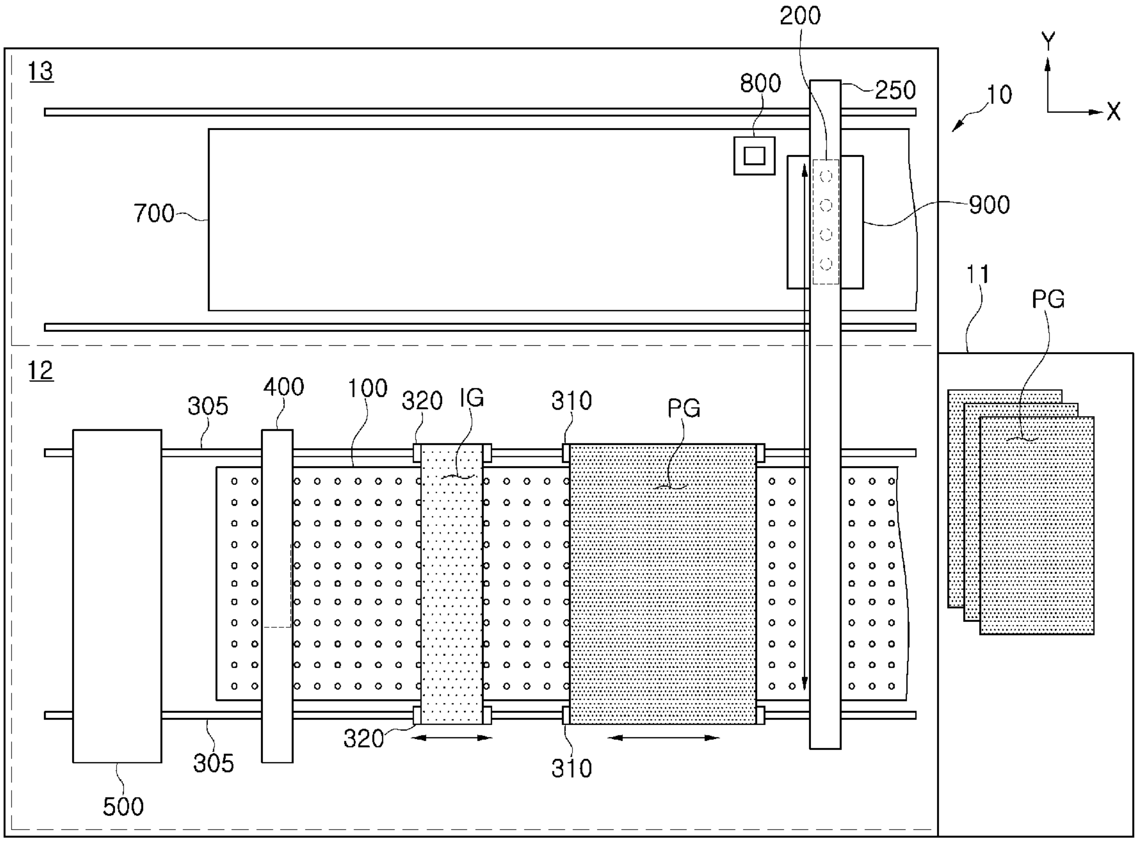

FIGS. 12 and 13 illustrate a schematic structure of inkjet printing equipment 10 according to an embodiment of the present disclosure. According to the present disclosure, the inkjet printing equipment 10 may include a maintenance section 13 for performing maintenance of devices (for example, head unit 200) required for process processing in addition to process processing. For example, when a droplet D is discharged onto the measurement substrate IG and an inspection is performed before the process processing, and as a result, it is determined that the head unit 200 has a problem, the head unit 200 may be moved to the maintenance section 13 without disassembling the head unit 200, and the maintenance may be performed. When the nozzle of the head unit 200 is clogged, clogging may be removed by performing cleaning of the corresponding nozzle, and then the head unit 200 may be moved to a process processing section 12 again. Then, the process processing may be performed. FIG. 12 illustrates the case where the head unit 200 is located in the process processing section 12. FIG. 13 illustrates the case where the head unit 200 is located in the maintenance section 13 for maintenance.

According to the embodiment of the present disclosure, the inkjet printing equipment 10 includes a loading section 11 in which a process substrate PG is carried in and out, a process processing section 12 in which the process processing is performed on the process substrate PG, a maintenance section 13 disposed to be adjacent to the process processing section 12, a first gantry 250 installed above the process processing section 12 and the maintenance section 13, and a head unit 200 configured to be movable along the first gantry 250 and discharge a solution for processing the process substrate PG. According to the present disclosure, the process processing section 12 includes a process stage 100 configured to provide a processing space for the process substrate PG, a first gripper 310 configured to be movable along the process stage 100 and grip the side portion of the process substrate PG, a second gripper 320 configured to be movable along the process stage 100 and grip a measurement substrate IG onto which a droplet is discharged in order to inspect the head unit 200, guide members 305 disposed on both sides of the process stage 100 and configured to provide a movement path of the first gripper 310 and the second gripper 320, a droplet inspection unit 400 configured to inspect a discharge state of the droplet discharged onto the measurement substrate IG, and a cleaning unit 500 configured to remove a droplet D remaining on the measurement substrate IG.

When a droplet discharge state on the measurement substrate IG is normal, the first gripper 310 is set to transfer the process substrate PG to be located below the head unit 200, and the head unit 200 is set to discharge a droplet onto the process substrate PG. When the droplet discharge state on the measurement substrate IG is abnormal, the head unit 200 is set to move to the maintenance section 13.

According to the present disclosure, the maintenance section 13 may include a nozzle inspection unit 800 configured to inspect a nozzle of the head unit 200 and a nozzle cleaning unit 900 configured to remove a foreign substance remaining on the nozzle. The nozzle inspection unit 800 may include one or more cameras and inspect whether there are foreign substances at each nozzle of the head unit 200. The nozzle cleaning unit 900 may include a blotter or a brush for performing cleaning of the nozzle of the head unit 200 and remove foreign substances in or around the nozzle with the blotter or the brush. The head unit 200 may spray a high-pressure solution to a container of a maintenance stage 700 to remove foreign substances therein.

When the maintenance on the head unit 200 has completed, the head unit 200 may move to the process processing section 12 along the first gantry 250 and discharge the solution onto the process substrate PG. Even though the maintenance on the head unit 200 has completed, an inspection may be performed again by discharging the solution onto the measurement substrate IG.

It will be apparent that the present embodiment and the drawings attached to this specification just clearly represent a part of the technical spirit included in the present disclosure, and all modification examples and specific embodiments that can be easily inferred by those skilled in the art within the scope of the technical spirit contained in the specification and drawings of the present disclosure are included in the scope of the present disclosure.

Therefore, the spirit of the present invention should not be limited to the described embodiments, and not only the claims to be described later, but also all those that have equal or equivalent modifications to the claims will be said to belong to the scope of the spirit of the present invention.

What is claimed is:

1. Inkjet printing equipment capable of measuring a droplet, the equipment comprising:

a loading section in which a process substrate is carried in or out;

a process processing section in which process processing is performed on the process substrate;

a maintenance section disposed to be adjacent to the process processing section and in which maintenance of a device is performed for the process processing;

a gantry installed above the process processing section and the maintenance section; and a head unit configured to be movable along the gantry and discharge a solution for processing the process substrate, wherein the process processing section includes:

a process stage configured to provide a processing space for the process substrate, guide members disposed on both sides of the process stage, a first gripper configured to be movable along the guide members and grip a side portion of the process substrate, a second gripper configured to be movable along the guide members and grip a measurement substrate onto which the droplet is discharged in order to inspect the head unit, a droplet inspection unit configured to inspect a discharge state of the droplet discharged onto the measurement substrate, and a cleaning unit configured to remove the droplet remaining on the measurement substrate.

2. The inkjet printing equipment capable of measuring the droplet, according to claim 1, wherein the process stage is caused to float by applying air pressure to a lower portion of the process stage, the first gripper and the second gripper are configured to move along the process stage in a first direction, and the head unit is configured to discharge the droplet onto the process substrate and the measurement substrate while moving along the gantry in a second direction perpendicular to the first direction.

3. The inkjet printing equipment capable of measuring the droplet, according to claim 1, wherein the droplet inspection unit includes a vision inspection unit configured to capture an image of the droplet on the measurement substrate and inspect a discharge position of the droplet or a shape of the droplet from the captured image.

4. The inkjet printing equipment capable of measuring the droplet, according to claim 1, wherein the droplet inspection unit compares a position of the discharged droplet on the measurement substrate to a reference position and outputs information on a nozzle in which a discharge failure has occurred in the head unit.

5. The inkjet printing equipment capable of measuring the droplet, according to claim 1, wherein the droplet inspection unit compares a shape of the droplet to a reference shape and outputs information on a nozzle in which a discharge failure has occurred in the head unit.

6. The inkjet printing equipment capable of measuring the droplet, according to claim 1, wherein when a droplet discharge state on the measurement substrate is normal, the first gripper is set to transfer the process substrate to be located below the head unit, and the head unit is set to discharge the droplet onto the process substrate, and when the droplet discharge state on the measurement substrate is abnormal, the head unit is set to move to the maintenance section.

7. The inkjet printing equipment capable of measuring the droplet, according to claim 1, wherein the maintenance section includes:

a nozzle inspection unit configured to inspect a nozzle of the head unit, and a nozzle cleaning unit configured to remove a foreign substance remaining on the nozzle.

* * * * *